3,409,676
PHENYLENEOXYALKANOL-SULFUR CONDENSATION PRODUCTS

Bruce N. Wilson, Niagara Falls, N.Y., assignor to Hooker Chemical Corporation, Niagara Falls, N.Y., a corporation of New York
No Drawing. Original application May 27, 1964, Ser. No. 370,705. Divided and this application Nov. 21, 1966, Ser. No. 601,727
4 Claims. (Cl. 260—609)

ABSTRACT OF THE DISCLOSURE

Condensation products are comprised of phenyleneoxyalkanol radicals joined by sulfur-bearing radicals, which can be one or more connected sulfur atoms or a sulfur oxide radical such as a sulfoxide radical or a sulfone radical. The condensation products generally contain an average of 2 to 10 phenyleneoxyalkanol radicals, more usually an average of 2.5 to 7 phenyleneoxyalkanol radicals, and preferably an average of 2.5 to 4 phenyleneoxyalkanol radicals. The products have a hydroxyl number of about 30 to 500 and a viscosity in the range of 20 Gardner seconds at 50 degrees centigrade to 500 Gardner seconds at 120 degrees centigrade. The condensation products are useful in the preparation of polyurethane compositions by reaction with organic polyisocyanates. They are also useful in the preparation of unsaturated polyester resins, modified and unmodified alkyd resins, epoxy resins, and other polycondensation and polyaddition products. These products are useful in the preparation of foamed plastics, adhesives, binders, laminates, coatings, and potting compounds.

---

This is a division of application S.N. 370,705, filed May 27, 1964.

This invention relates to novel sulfur containing condensation products. The invention also relates to novel polyurethane compositions containing the sulfur condensation products, and to processes for producing them. In another aspect, the invention relates to novel, fire-resistant polyurethane compositions.

The products of the invention are useful in the preparation of polyurethane compositions, unsaturated polyester resins, modified and unmodified alkyd resins, epoxy resins, and other polycondensation and polyaddition products. These products are useful in the preparation of foamed plastics, adhesives, binders, laminates, coatings, and potting compounds.

The polyurethane compositions of the invention are particularly useful in the preparation of foamed or cellular plastic products. They are also useful in the preparation of adhesives, binders, laminates, coatings, and potting compounds. The polyurethane foams are useful as insulating materials in both cold and hot applications, such as in domestic refrigerators and refrigerated vehicles, as well as in insulation for hot water or steam pipes, valves, and the like. The foam products are also useful as core materials between skins such as aluminum or steel or plastics of various types. The resulting sandwich-type structures are well suited for use in such diverse fields as the construction and insulation industries.

There is an ever growing need in industry for polyurethane compositions that can be made at low cost, but which have good physical properties. There is increasing interest in compositions having good fire-resistance, but it is necessary that the manufacturing cost of such materials be kept relatively low to meet competition.

Accordingly, it is an object of this invention to provide novel condensation products from inexpensive raw materials. Another object is to provide novel polyurethane compositions. It is another object of the invention to provide an economical process for making polyurethane foams having excellent physical properties. A further object of the invention is to provide polyurethane compositions, especially foamed products, that have good, inherent fire-resistance, as well as low heat distortion, high compressive strength and good retention of foaming agents. Another object of the invention is to provide a polyurethane composition suitable for use in producing a very highly fire-retardant, or non-burning polyurethane foam, without the need for halogen-containing polymeric materials. These and other objects of the invention will become apparent from a consideration of the following detailed specification.

This invention relates to condensation products comprised of phenyleneoxyalkanol radicals (hydroxyalkylated phenol residues) joined by sulfur-bearing radicals. The sulfur-bearing radicals can be one or more connected sulfur atoms, preferably one to four connected sulfur atoms, a sulfoxide (sulfinyl) radical, or a sulfone (sulfonyl) radical. The condensation products generally contain an average of 2 to 10 phenyleneoxyalkanol radicals, more usually an average of 2.5 to 7 phenyleneoxyalkanol radicals, and preferably an average of 2.5 to 4 phenyleneoxyalkanol radicals. They have a hydroxyl number of about 30 to 500, more usually in the range of about 200 to 400. The viscosity of the condensation product is in the range of 20 Gardner seconds at 50 degrees centigrade to 500 Gardner seconds at 120 degrees centigrade, preferably 50 to 500 seconds at 50 degrees centigrade.

The polyurethane compositions of the invention comprise the reaction products of an organic polyisocyanate with the foregoing condensation products. If a foamed product is desired, the reaction is carried out in the presence of a foaming agent. In another aspect of the invention, phosphorus compounds are included in the composition to render them extremely fire-resistant. It is also within the scope of the invention to incorporate other hydroxyl-containing compositions in the polyurethane compositions of the invention.

The sulfur condensation product of the invention can be produced by a process comprising (a) condensing a phenol with a sulfur halide, and (b) oxyalkylating the resulting phenol-sulfur condensate. An alternate process for preparing the sulfur condensation products comprises (a) providing an oxyalkylated phenol, and (b) condensing the oxyalkylated phenol with a sulfur halide. The products resulting from these processes comprise phenyleneoxyalkanol radicals joined together by one or more sulfur atoms. Other products that are useful in the practice of the invention result from oxidation of the sulfur condensation product to provide modified sulfur condensation products having oxyalkylated phenyl radicals joined together by sulfoxide or sulfone radicals.

The phenyleneoxyalkanol radicals generally have the formula

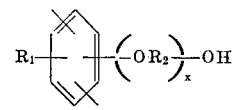

wherein $R_1$ is hydrogen, fluorine, chlorine, bromine or a hydrocarbon radical; $R_2$ is a hydrocarbon radical, and $x$ is an integer from 1 to 20.

Examples of phenols which can be used in preparing the sulfur condensation products include phenol itself or substituted phenols having the following general formula:

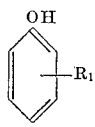

wherein $R_1$ can be hydrogen, fluorine, chlorine, bromine, alkyl or alkenyl groups of 1 to 18 carbon atoms, alicyclic groups of 5 to 18 carbon atoms, or aromatic or aralkyl groups of 6 to 18 carbon atoms. The phenols are characterized in that at least about half the substituted phenols in the reaction mixture have at least 2 of the ortho and para positions of the phenol nucleus available for condensation reaction (unsubstituted). Suitable substituted phenols include para-tertiary-butylphenol, para-isooctylphenol, para-phenylphenol, para-benzylphenol, para-cyclohexylphenol, para-nonylphenol, para-cumylphenol, para-chlorophenol, para-fluorophenol, parabromophenol, as well as the corresponding ortho and meta derivatives such as meta-butylphenol and ortho-butylphenol, as well as mixtures thereof. Additional phenolic compounds include naphthols and polyhydric benzenes and naphthalenes, such as resorcinol, hydroquinone, catechol, dihydroxy naphthalene and phloroglucinol.

Various sulfur halides can be used in preparing the sulfur condensation products of the invention. Suitable compounds are sulfur monochloride, sulfur dichloride, and sulfur bromide. The sulfur chlorides are preferred.

The phenols or the phenol-sulfur condensates are preferably hydroxyalkylated by reaction with compounds containing a mono oxirane ring. Monoepoxides and diepoxides can be used in this reaction. Typical monoepoxides include ethylene oxide, propylene oxide, butylene oxide, cyclohexane oxide, styrene oxide, allyl glycidyl ether, glycidyl sorbate, methyl glycidyl ether, glycidyl methyl sulfone, glycidyl acrylate, glycidyl allyl phthalate, and the like. The preferred monoepoxides are the monoepoxide-substituted hydrocarbons, the monoepoxide-substituted ethers, sulfides, sulfones, and esters wherein the compounds contain 2 to 18 carbon atoms. Typical diepoxides are: cyclopentadiene dioxide and limonene dioxide. Examples of suitable polyepoxides that can be used in very small amounts are: epoxidized vegetable oils and novolac polyglycidyl ethers. Many other epoxides can be used but the alkylene oxides containing 2 to 6 carbon atoms are generally employed.

Alternatively, hydroxyalkylation can be carried out by reacting the phenols or phenol-sulfur condensates with an alkylene halohydrin, such as ethylenechlorohydrin or glyceryl bromohydrin in the presence of an alkali metal hydroxide, such as sodium or potassium hydroxide. The hydroxyalkylation can also be performed by reacting the phenol or phenol-sulfur condensate with an alkylene carbonate, such as ethylene or propylene carbonate, in the presence of an alkali metal carbonate, such as sodium carbonate or potassium carbonate.

In the condensation reaction, up to two moles of sulfur halide are employed in the reaction process per mole of phenol (or oxyalkylated phenol). The ratio is generally in the range of 0.3 to 2 moles of sulfur halide per mole of phenol, and preferably in the range of 0.5 to 1 mole of sulfur halide per mole of phenol (or oxyalkylated phenol). Various reaction temperatures can be employed, but the temperature during the addition of sulfur halide is preferably maintained below the decomposition temperature of the sulfur halide. The initial temperature is generally maintained relatively low, i.e., up to 50 degrees centigrade, and the sulfur halide is introduced into the phenol (or oxyalkylated phenol) continuously or portionwise over a period of time to prevent too rapid an evolution of hydrogen halide and loss of unreacted sulfur halide. The temperature can be permitted to rise to near the decomposition temperature or boiling point of the sulfur halide during the addition thereof. While the reaction proceeds rapidly, sufficient reaction time must be provided for permitting the efficient introduction of the sulfur halide into the reaction mixture. Accordingly, reaction times can vary from 1 hour up to 5 or 10 hours. When the addition of the sulfur halide is complete, the temperature of the reaction mixture is raised to 100 to 180 degrees centigrade and vacuum is applied. Distillation is employed to remove at least a portion of the unreacted phenol and halogenated phenol by-products from the reaction product. Distillation pressure is preferably in the range of 0.1 mm. Hg to atmospheric pressure or higher. The distillation is generally continued until the reaction product contains from 0.5 to 2, preferably 0.5 to 1, and still more preferably from 0.85 to 1 atom of sulfur per mole of phenol (or oxyalkylated phenol).

Catalysts for the hydroxy alkylation reactions with oxirane ring compounds are the alkali metals, alkali or alkaline earth hydroxides, primary, secondary, and tertiary amines or basic alkali salts. The preferred catalysts are the alkali metals, i.e. sodium and potassium. Other suitable catalysts include sodium, potassium, lithium, calcium, and barium hydroxides; methyl, dimethyl, triethyl, and tripropyl amines, and the like; and salts of strong bases and weak acids such as sodium acetate or sodium benzoate. The hydroxyl alkylation reaction is generally carried out at temperatures in the range of 50 to 150 degrees centigrade, preferably at least 120 degrees, and preferably in the absence of solvents. It is preferred to maintain an inert gas atmosphere in the reaction zone, e.g., nitrogen, carbon dioxide, argon, and the like. It is preferred to employ at least about 1 mole of hydroxyalkylation agent per mole of phenolic hydroxyl so that the product contains substantially no free reactive phenolic groups (less than about 5 percent of phenolic hydroxyl group). The hydroxyl number of the condensation products of the invention can be adjusted by controlling the ether chain length. Likewise, the physical properties of the polyurethane compositions of the invention can be adjusted by controlling the ether chain lengths. Generally for rigid foams, up to about 10 moles of hydroxyalkylation agent are reacted per mole of phenolic hydroxyl. In the production of flexible foams, the desired ether chain length is dependent on the molecular weight of the condensation product, but will generally not exceed about 100 units of hydroxyalkylation agent per mole of phenolic hydroxyl, and usually does not exceed about 20 units per mole.

In one aspect of the invention, the sulfur condensation products can be modified by oxidation of the sulfur atoms to sulfur oxide radicals, i.e., sulfoxide and/or sulfone radicals. It is preferred that the phenyleneoxyalkanol radicals be joined by single sulfur atoms, or contain not more than 10 percent of polysulfide chains. Suitable oxidizing agents are hydrogen peroxide and the organic peroxides such as: acetyl peroxide, trichloroacetyl peroxide, benzoyl peroxide, tertiarybutyl peroxide, cumyl peroxide, peracetic acid, perbenzoic acid, cumene hydroperoxide, acetone peroxide, and the crude peroxide-containing mixtures obtainable by partial oxidation of terpenes, olefins, or alkyl aromatic hydrocarbons. The reaction with oxygen can, alternatively, be catalyzed by exposure to actinic light or by use of other non-peroxidic catalysts such as azoisobutyronitrile, chlorine, activated carbon, manganese or cobalt naphthenates or other transition metal salts, ozone, or nitrogen oxides. Oxidation temperatures within the range of 30 to 150 degrees centigrade can be employed. Reaction times generally in the range of 1 to 5 hours.

Various organic polyisocyanates can be used in preparing the polyurethane compositions of the invention. Among those isocyanates are 2,4-tolylene diisocyanate, 2,6-tolylene diisocyanate, and mixtures thereof, and particularly the crude mixtures thereof that are commercially available. Other typical polyisocyanates include methylene-bis-(4-phenyl isocyanate); n-hexyl diisocyanates; 1,5-naphthalene diisocyanate; 1,3-cyclopentylene diisocyanate; p-phenylene diisocyanate; 2,4,6-tolylene triisocyanate; 4,4',4''-triphenylmethane triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

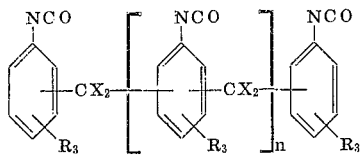

wherein $R_3$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms and phenyl; and $n$ has an average value of at least 1 and generally about 1 to 3. The preferred composition of this type is polymethylene polyphenylisocyanate which is a mixture of compounds having the following generalized formula:

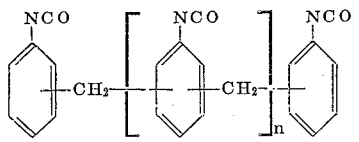

wherein $n$ has an average value of at least 1 and generally is from 1 to 3. Other typical compounds of this type include those wherein the $R_3$ groups are chlorine, bromine, methyl or methoxy, and wherein the value of X is methyl or phenyl in the generic formula.

Any foaming agent commonly used in the art can be employed. These are generally those materials that are capable of liberating gaseous products when heated, or when reacted with an isocyanate. Preferably, foaming is accomplished by introducing a low boiling liquid into the urethane components. The heat of reaction is then sufficient to expand the mixture to a foam stable enough to retain its shape until the polymer gels. Suitable liquids are the fluorochlorocarbons boiling in the range of −30 to 50 degrees centigrade and mixtures thereof, for example, trichlorofluoromethane, trichlorotrifluoroethane, difluoromonochloroethane, and difluorodichloroethane. Also useful are mixtures of the fluorocarbons with chlorocarbons such as methylene chloride. Another class of foaming agents that is suitable for carrying out the foaming reaction at an elevated temperature is a tertiary alcohol in combination with a strong concentrated acid catalyst. Examples of tertiary alcohols include: tertiary amyl alcohol; tertiary butyl alcohol; and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxy methylphosphonium chloride.

If desired, a reaction catalyst can be employed in preparing the composition of the invention. Generally, but not necessarily, catalysts are employed to prepare the polyurethane foams having densities up to about 6 pounds per cubic foot. For foam products having densities of 6 pounds per cubic foot and higher, reaction catalysts are generally not needed. The catalysts employed can be any of the known conventional catalysts for isocyanate reactions, but the tertiary amines are preferred. Many such compounds are useful in the reaction, but they generally have up to 20 carbon atoms. Typical compounds of the trialkyl amines, such as trimethyl amine, triethyl amine, diethylene triamine, tetramethyl butane diamine and the like. Also suitable are the morpholine compounds such as N-methyl morpholine, N-acetyl morpholine, 4,4'-dithio morpholine, and the like, and the tertiary amine compounds have other functional groups such as diethyl ethanol amine, methyl diethanol amine, N-diethyl aminoacetic acid, methyl aminodipropionic acid, N-methyl dipropylene triamine, dimethyl piperazine, and the like. The preferred amine compounds are triethyl amine and tetramethyl guanidine. Other urethane catalysts are also useful, for example: the antimony compounds, such as antimony caprylate, antimony naphthenate, and antimonous chloride; the tin compounds such as dibutyltin dilaurate, tri-n-octyltin oxide, hexabutylditin, tributyltin phosphate or stannic chloride.

The compositions of the invention comprising the reaction product of the condensation products and organic polyisocyanates have good fire-resistance. Thus, for example, polyurethane foams made of these compositions are rated "self-extinguishing" by the ASTM D-1692 test procedure. The compositions can be rendered even more fire-resistant, so that they can achieve a "non-burning" rating by the ASTM D-1692 test by incorporating in the compositions various phosphorus compounds. Particularly suitable phosphorus compounds for this purpose have the following formula:

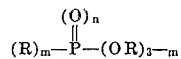

wherein $n$ is from 0 to 1, $m$ is from 0 to 3 when $n$ is 1, $m$ is from 0 to 2 when $n$ is 0, and R is selected from the group consisting of alkyl, halogen-substituted alkyl, aralkyl, alkylaryl, and aryl. The hydrocarbon radicals preferably contain from 1 to 20 carbon atoms. For any given compound, the value of R can be the same or different and compounds wherein the hydrocarbon radicals join to form a ring are also contemplated, such as phenyl ethylene phosphite. The alkyl groups can be substituted with a mixture of halogen atoms, such as mixtures of chlorine and bromine atoms. Typical phosphorus compounds that can be employed in accordance with the invention include the following compounds wherein R has the value defined hereinbefore:

Third degree esters of phosphoric acid (tertiary phosphates),

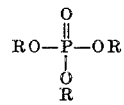

for example: trimethyl phosphate, triethyl phosphate, ethyl dimethyl phosphate, trilauryl phosphate, triphenyl phosphate, tricresyl phosphate, tribenzyl phosphate, phenyl ethylene phosphate, tris (β-chloroethyl) phosphate, tris-para-chlorophenyl phosphate, tris(2,3-dichloropropyl) phosphate, and tris(2,3-dibromopropyl) phosphate.

Second degree esters of phosphonic acid (secondary phosphonates),

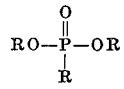

for example: dimethyl methylphosphonate, diamyl amylphosphonate, dilauryl methylphosphonate, diphenyl methylphosphonate, dibenzyl methylphosphonate, diphenyl cresylphosphonate, bis(chloropropyl)chloropropylphosphonate, bis(chloropropyl)propenyl-2-phosphonate, and bis(2,3-dibromopropyl) 2,3-dibromopropyl phosphonate;

First degree esters of phosphonic acids (phosphinates),

for example: methyl diethylphosphinate, benzyl diphenylphosphinate, methyl diphenylphosphinate, chloropropyl bis(chloropropyl)phosphinate, and butyl 2-bromoethyl phenyl phosphinate;

Tertiary phosphine oxides,

for example: trimethyl phosphine oxide, triphenyl phosphine oxide, tribenzyl phosphine oxide, tris(chloropropyl) phosphine oxide, and 2-bromoethyl diphenyl phosphine oxide;

Third degree esters of phosphorous acid (tertiary phosphites),

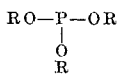

for example: triethyl phosphite, trilauryl phosphite, triphenyl phosphite, tribenzyl phosphite, phenyl ethylene phosphite, phenyl dimethyl phosphite, tris-para-chlorophenyl phosphite, tris($\beta$-chloroethyl) phosphite, and tris (2-bromoethyl) phosphite;

Second degree esters of phosphonous acids (secondary phosphonites),

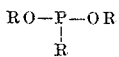

for example: dimethyl methylphosphinite, diphenyl methylphosphonite, dibenzyl methylphosphonite, dimethyl cresylphosphonite, bis(chloropropyl) chloropropyl phosphonite, and bis(bromopropyl)bromopropylphosphonite;

First degree esters of secondary phosphine oxides (phosphinites), and

for example: methyl dimethylphosphinite, phenyl diphenylphosphinite, methyl diphenylphosphinite, chloropropyl bis(chloropropyl)phosphinite, and 2,3-dibromopropyl diphenylphosphinite.

The phosphorus acids can also be advantageously employed in the compositions of the invention.

The term "phosphorus acids" as used in describing the acidic phosphorus compounds of the invention include not only the mineral acids such as phosphoric acid and those acids having direct carbon-to-phosphorus bonds such as the phosphonic and phosphinic acids, but also those partially esterified phosphorus acids which contain at least one remaining unesterified acid group such as the first and second degree esters of phosphoric acid and the like.

Typical phosphorus acids that can be employed in the invention include the following compounds wherein R is as defined hereinbefore:

phosphoric acid,

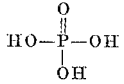

phosphorous acid,

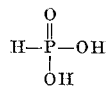

hypophosphorous acid,

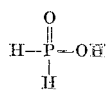

phosphonic acids,

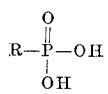

for example: methylphosphonic acid, hexylphosphonic acid, phenylphosphonic acid, tolylphosphonic acid, benzylphosphonic acid, and 2-phenylethylphosphonic acid;

phosphinic acids (secondary phosphonic acid),

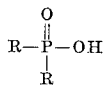

for example: dimethylphosphinic acid, methylhexylphosphinic acid, diphenylphosphinic acid, phenylnapthylphosphinic acid, dibenzylphosphinic acid, methylphenylphosphinic acid, and bis(hydroxymethyl) phosphinic acid;

phosphonous acids,

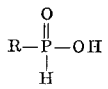

for example: ethylphosphonous acid, phenylphosphonous acid, tolylphosphonous acid, and benzylphosphonous acid;

first degree esters of phosphoric acid (primary phosphates),

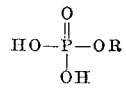

for example: methyl phosphoric acid, butyl phosphoric acid, 2-ethylhexyl phosphoric acid, phenyl phosphoric acid, cresyl phosphoric acid, and benzyl phosphoric acid;

second degree esters of phosphoric acid (secondary phosphates),

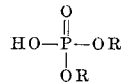

for example: dibenzyl phosphoric acid, dimethyl phosphoric acid, dibutyl phosphoric acid, di(2-ethylhexyl) phosphoric acid, diphenyl phosphoric acid, methyl phenyl phosphoric acid, and phenyl benzyl phosphoric acid;

first degree esters of phosphorous acid (primary phosphites),

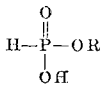

for example: methyl phosphorous acid, pentyl phosphorous acid, phenyl phosphorous acid, cresyl phosphorous acid, and benzyl phosphorous acid;

second degree esters of phosphorous acid (secondary phosphites), can be used with a little more difficulty because they are weak acids, for example: dimethyl phosphorous acid (dimethyl phosphite), methyl butyl phosphorous acid, diphenyl phoshorous acid, phenyl benzyl phosphorous acid, dibenzyl phosphorous acid, and methyl phenyl phosphorous acid;

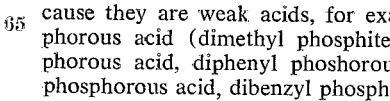

first degree esters of phosphonic acid (primary phosphonates), for example: ethyl methylphosphoric acid, methyl butyl phosphonic acid, phenyl phenylphosphonic acid, tolyl methylphosphonic acid, and ethyl benzylphosphonic acid; first degree esters of phosphonous acid (primary phosphonites),

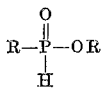

can be used with a little more difficulty because they are weak acids, for example: methyl ethylphosphonous acid, methyl phenylphosphonous acid, and phenyl phenylphosphonous acid.

Phosphorus compounds of the foregoing types wherein sulfur is substituted for the oxygen atoms can also be employed.

Another class of phosphorus compound useful with the condensation products of the invention in the preparation of polyurethane compositions are the compounds having the formula:

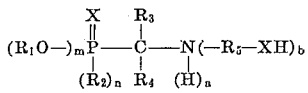

wherein $m$ and $n$ have a numerical value of zero through two, and $m+n$ equals two; $a$ has a value of zero or one, $b$ has a value of one or two, and $a+b$ equals two; X is oxygen or sulfur; $R_1$, $R_2$, $R_3$, $R_4$, are organic radicals selected from the group consisting of alkyl, cycloalkyl, alkenyl, aryl, alkylaryl, arylalkyl, and halo-substituted organic radicals of the foregoing group; and $R_3$ and $R_4$ can also be hydrogen, and $R_5$ is an alkyl group.

Examples of the foregoing compounds are dimethyl-N-(2'-hydroxyethyl)-2 - aminoisopropyl-2 - phosphonate; dimethyl - N - (2'-hydroxyethyl)-2-aminoethyl-2-phosphonate; dibutyl - N - bis-(2'-hydroxyethyl)-2-aminoethyl-2-phosphonate.

Other useful phosphorus compounds that can be used in combination with the condensation products of the invention are the esters of phosphonic acid having the formula:

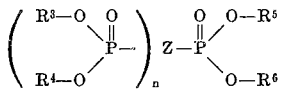

wherein Z is selected from the group consisting of alkyl, alkylene, alkenyl, aryl substituted alkyl, aryl, alkyl substituted aryl, nitroalkyl, halogen substituted aryl, heterocyclic, hydroxy substituted alkyl, hydroxy substituted alkylene, halogen substituted alkylene, substituted alkenyl, halogen substituted alkyl, hydroxy substituted aryl, hydroxy aryl substituted alkyl, hydroxy alkyl substituted aryl, hydroxy alkyl substituted heterocyclic, hydroxy alkoxy alkyl, hydroxy polyalkoxy alkyl and mixtures thereof, $R^3$, $R^4$, $R^5$ and $R^6$ are selected from the group consisting of alkyl, aryl, alkyl substituted aryl, aryl substituted alkyl, nitro alkyl, halogen substituted aryl, halogen substituted alkyl, hydroxy alkyl, alkoxyalkyl, hydroxy alkoxy, alkenyl, substituted alkenyl, hydroxy polyalkoxy alkyl, and mixtures thereof, $n$ is from 0 to 5 and the molecule contains from 3 to about 32 hydroxyls.

Examples of the foregoing esters of phosphonic acid are bis(oxypropylated pentaerythritol) oxpropylated pentaerythritol phosphonate; bis-(trimethylol propane)trimethlolpropane phosphonate; bispentaerythritol butane phosphonate; and bis-trimethylol propane trichlorobenzyl chloride phosphonate. The preparation of these and other such compounds is disclosed in copending application S.N. 329,858, filed Dec. 11, 1963.

Also useful in combination with the condensation products of the invention are the esters of phosphonic acid having the formula:

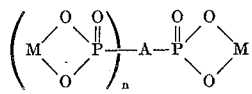

wherein M is the residue of a polyol wherein two hydroxyls are removed from a group of carbon atoms with hydroxyls attached thereto and one carbon atom between the two carbon atoms from which the hydroxyl groups have been removed, A is selected from the group consisting of an aliphatic and an aromatic radical, $n$ is selected from 0 to 5 and the molecule has 2 to 32 hydroxyl groups.

Examples of the foregoing compounds are pentaerythritol butane phosphonate; bromodipentaerythritol decane phosphonate; chlorodipentaerythritol furfuryl phosphonate; and chloro - 1,1,1,3,3,3,-hexamethylol propanol-2-benzyl phosphonate. The preparation of these and other such compounds is disclosed in copending application S.N. 323,114, filed Nov. 12, 1963.

In preparing the polyurethane compositions of the invention, one or more of the sulfur condensation products of the invention can be employed in admixture, for example, a product based on phenol itself and a product based on nonyl phenol. In addition, admixtures of the sulfur condensation product of the invention with other hydroxyl-containing materials can be employed. Suitable auxiliary hydroxyl-containing polymeric materials generally have a hydroxyl number between about 30 and 950. Such materials can be a polyester, a polyether, or mixtures thereof, commonly having a molecular weight in the range of 200 to about 4,000. Other hydroxyl containing materials are polyhydric alcohols having at least two, and preferably at least three hydroxyl groups. Suitable examples are listed hereinafter in the description of the polyesters.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide, or mixtures thereof. The carboxylic compounds can be aliphatic, cycloaliphatic, aromatic, or heterocyclic and either saturated or unsaturated. Among the polycarboxylic compounds which can be used are: maleic acid; fumaric acid; phthalic acid; isophthalic acid; terephthalic acid; tetrachlorophthalic acid; aliphatic acids such as oxalic, malonic, succinic, glutaric and adipic; 1,4-cyclo-hexadiene-1,2-dicarboxylic acid and the like. Additional polycarboxylic compounds which can be used to form the polyester are Diels-Alder adducts of hexahalocyclopentadiene and a polycarboxylic compound containing aliphatic carbon-to-carbon unsaturation, wherein the halogen is selected from the group consisting of chlorine, bromine, fluorine, and mixtures thereof, for example: 1,4,5,6,7,7-hexachlorobicyclo-(2.2.1)-5-heptene-2,3-dicarboxylic acid; 1,4,5,6-tetrachloro-7,7-difluorobicyclo - (2.2.1) - 5 - heptene - 2,3 - dicarboxylic acid; 1,4,5,6,7,7 - hexabromobicyclo - (2.2.1) - 5 heptene-2,3-dicarboxylic acid; 1,4,5,6-tetrabromo-7,7-difluorobicyclo-(2.2.1)-5-heptene-2,3-dicarboxylic acid; and the corresponding acid anhydrides, acid halides, and acid esters. Mixtures of any of the above polycarboxylic compounds can be employed.

At least a portion of the total polyhydric alcohol component of the polyesters should comprise a polyhydric alcohol containing at least three hydroxyl groups. Suitable polyfunctional alcohols include ethylene glycol, diethylene glycol, propylene glycol, polypropylene glycols, polybutylene glycols, glycerol, hexanetriol, trimethylol propane, trimethylol ethane, mannitol, cylcohexanediol-1,4; glycerol monoethyl ether; 2,3-dimethylol-1,4,5,6,7,7-hexachlorobicyclo - (2.2.1) - 5 - heptene; 2,3 - dimethylol - 1,4,5,6-tetrachloro-7,7-difluorobicyclo-(2.2.1)-5-heptene; and the like. The ratio of the polyhydric alcohol to polybasic acid can be expressed as the hydroxyl-carboxyl ratio, which can be defined as the number of moles of hydroxyl groups to the number of moles of carboxyl groups in a given weight of polyester. This ratio can be varied over a wide range. Generally, however, a hydroxyl-carboxyl ratio of between 1.5:1 to 5:1 is used.

The polyether employed as auxiliary hydroxyl-containing polymeric materials are known in the art. Generally, they are the reaction products of (1) either a polyhydric alcohol, a polycarboxylic acid or a polyphenolic compound, and (2) a monomeric 1,2-epoxide having a single 1,2-epoxy group, such as propylene oxide. The polyhydric alcohols, polycarboxylic acids, and monomeric 1,2-epoxides which can be employed are any of the polyhydric alcohols, polycarboxylic acids, and monomeric 1,2-epoxides enumerated hereinbefore. The polyphenolic compounds which can be used are the reaction products of aldehydes having, for example, 1 to 8 carbon atoms with phenols of the type described hereinbefore. A typical example is a phenol-formaldehyde novolac resin.

Various additives can be incorporated in the polyurethane composition to modify the properties thereof. For example, the fire resistance of the composition can be further improved by the addition of an antimony compound. Fillers, such as clay, calcium sulfate or ammonium phosphate can be added to lower the cost; components, such as dyes can be added for color; and fibrous glass, asbestos, synthetic fibers can be added to improve strength characteristics. Surfactants are generally employed to control cell structure of foam products. Suitable cell controllers are the silicone-glycol copolymers, such as triethoxy dimethyl polysiloxane copolymerized with a dimethoxyethylene glycol.

In preparing the polyurethane compositions of the invention, the hydroxyl-containing polymeric components and the organic polyisocyanate are preferably reacted in a ratio sufficient to provide about 85 to 115 percent of isocyanato groups with respect to the total number of hydroxyl and carboxyl groups in the hydroxyl-containing polymeric material and the foaming agent. Various amounts of auxiliary hydroxyl-containing components can be employed, but generally the condensation products of the instant invention will comprise from 25 to 100 percent of the total hydroxyl-containing components of the composition. In the embodiments of the invention wherein phosphorus compounds are used in combination with the condensation products of the invention, the phosphorus compounds generally comprise from about 1 part up to about 20 parts by weight per 100 parts of the hydroxyl-containing components. The preferred amount of the phosphorus compound is from 2 to about 10 parts by weight per 100 parts of hydroxyl-containing component. It is generally preferred to add the phosphorus compounds directly to the hydroxyl-containing components to reduce viscosity, and subsequently to add the polyisocyanate and the foaming agent; however, excellent results are obtained when all the components are simultaneously mixed together. The reaction temperature generally ranges from about 20 to about 120 degrees centigrade, although higher and lower temperatures can be used. When polyurethane foam products are desired, the stream temperatures can be adjusted to provide the foamable composition in a pre-expanded or frothed condition, if desired.

The following examples serve to illustrate the invention, but are not intended to limit it. All parts are by weight and temperatures in degrees centigrade unless it is indicated otherwise.

EXAMPLE 1

Into a reaction vessel equipped with a condenser and an agitator, 778 parts of phenol were introduced and heated to about 50 degrees centigrade. While maintaining agitation of the reactor contents, sulfur dichloride was continuously introduced to the reaction vessel well beneath the surface of the phenol under the following conditions:

| Increment: | Parts $SCl_2$ added | Temperature °C. at the end of each increment | Time, Hours |
|---|---|---|---|
| 1 | 162 | 50 | 1.75 |
| 2 | 324 | 65 | 2.0 |
| 3 | 486 | 80 | 1.0 |
| 4 | 85.5 | 80 | 1.0 |

Hydrogen chloride was evolved, and passed from the reaction zone through the condenser. Upon the completion of the addition of the sulfur-dichloride, the temperature of the reaction mixture was raised to 145 degrees centigrade. Vacuum was applied to the condenser and the temperature of the reaction mixture was maintained at 140–145 degrees centigrade. A total of 221 parts of by-product was distilled from the reaction product. Then 0.8 part of metallic sodium was added to the reactor, and the introduction of ethylene oxide was begun at a rate sufficient to maintain almost complete reaction of the ethylene oxide without losing ethylene oxide through the condenser. During the addition of ethylene oxide, the temperature of the reaction mixture was maintained at 140–145 degrees centigrade by continuously cooling the reactor contents. After 403 parts of ethylene oxide were added, the reaction was discontinued and the reaction mixture was discharged from the reaction vessel. Twelve hundred parts of product were obtained having a hydroxyl number (mg.KOH/gm. product) of 366 and a viscosity of 85 Gardner seconds at 50 degrees centigrade (2 Gardner seconds at 100 degrees centigrade).

EXAMPLE 2

Into a reaction vessel equipped with an agitator, were charged 141 parts by weight of phenol and 55 parts by weight of monochlorobenzene. The temperature was adjusted to 50 degrees centigrade, and 135 parts of sulfur monochloride were added slowly. Thereafter, the reaction mixture was heated to 145 degrees centigrade, and the unreacted phenol and the monochlorobenzene were distilled off. The product was light amber in color, had a hydroxyl number of 383 (mg. KOH per gm. product), a sulfur content of 35.84 percent, a chlorine content of 2.96 percent and a molecular weight of 351±5% as measured by vapor pressure osmometry. Thereafter, 195 parts of the sulfur condensation product were reacted with 89.5 parts of ethylene oxide at a temperature of 100 to 150 degrees centigrade. The resulting product had a hydroxyl number of 265, a sulfur content of 24.6 percent and a chlorine content of 1.95 percent.

EXAMPLE 3

Using the procedure of Example 2, phenol and sulfur monobromide are reacted to produce a sulfur condensation product. The product is subsequently reacted with ethylene oxide to produce the etherified product.

EXAMPLE 4

Into a reactor equipped with an agitator were charged 141 parts of phenol. Then 103 parts of sulfur dichloride were added slowly. At the completion of the reaction, the unreacted phenol was distilled from the condensation product, a hydroxyalkylation catalyst was added, and 97.5 parts of propylene oxide were introduced to the reaction vessel. The hydroxyalkylated product was light red in color and had a hydroxyl number of 325 and a viscosity of 109 Gardner seconds at 50 degrees centigrade.

EXAMPLE 5

Into a reaction vessel equipped with an agitator and a condenser, were charged 252 parts of phenol, and the temperature was adjusted to about 50 degrees centigrade. Then a phenol-$BF_3$ catalyst solution (2.82 parts of $BF_3$ dissolved in 30 parts of phenol) was added to the reaction vessel and the contents were mixed. Then 379 parts of nonene were added slowly to the phenol, and the reaction mixture was permitted to rise to 70–80 degrees centigrade. After addition of the nonene was complete, the reaction mixture was heated to 120 degrees centigrade and maintained at that temperature for 3 hours. Then vacuum was applied to the condenser to remove low boiling materials from the reaction vessel. Thereafter, 700 parts of monochlorobenzene was added to the reaction mixture, which was then cooled to about 40 degrees centigrade.

To the nonyl phenol in the reactor was slowly added 206 parts of sulfur dichloride, beneath the surface of the liquid using conditions similar to those employed in Example 1. When the addition of sulfur dichloride was complete, the reaction mixture was heated to 100 degrees centigrade and maintained at this temperature for about one-half hour. The vacuum was applied to the condenser and the reaction mixture was heated to 165 degrees centigrade to distill unreacted materials and byproducts. Thereafter, the reaction mixture was cooled to 140–145 degrees centigrade and 1.3 parts of metallic sodium was added. While maintaining the reaction temperature at 140 degrees centigrade by cooling, 154 parts of ethylene oxide was slowly introduced beneath the liquid level. After the addition of ethylene oxide was completed, the sulfur condensation product was discharged from the reaction zone. The reaction product was light amber in color and had a hydroxyl number of 220.

EXAMPLE 6

Into a reactor equipped with an agitator were charged 193 parts of para-chlorophenol and 200 parts of monochlorobenzene. The mixture was heated to 70 degrees centigrade, and 105 parts of sulfur dichloride were slowly added while agitating the reacting mixture. After addition of all the sulfur dichloride, the reaction mixture was heated to 130 degrees centigrade and maintained at that temperature for one hour. Thereafter, the solvent and unreacted para-chlorophenol were removed from the reactor by vacuum distillation. Then 0.2 part of sodium metal was added to the reactor, and 86 parts of ethylene oxide were introduced beneath the surface of the reaction mixture. The resulting condensation product had a hydroxyl number of 282, and a viscosity of 6.3 Gardner seconds at 100 degrees centigrade.

EXAMPLE 7

A styrene-substituted phenol was prepared by introducing 188 parts of phenol and 0.2 part of sulfuric acid into an agitated reactor, adjusting the reactor temperature to about 50 degrees centigrade, followed by slowly adding 208 parts of styrene to the reactor. After introduction of all the styrene, the reaction mixture was heated at 130 degrees centigrade for one hour. The reactor temperature was reduced to 50 degrees centigrade, whereupon 137 parts of sulfur dichloride were slowly added beneath the surface of the styrenated phenol. After the addition of sulfur dichloride was complete, 0.2 part of sodium metal was added to the mixture, followed by introduction of 133 parts of gaseous ethylene oxide beneath the surface of the reaction mixture. The resulting condensation product had a hydroxyl number of 275.5 and a viscosity of 3.5 seconds at 100 degrees centigrade.

EXAMPLE 8

Into a suitable reaction zone, 282 parts of phenol were introduced and heated to 45 degrees centigrade. Then, 206 parts of sulfur dichloride were introduced beneath the liquid level. Upon completion of the reaction, unreacted phenol and some chlorinated phenols were removed from the reaction zone by vacuum distillation. Then 0.2 part of sodium was added to the reactor, followed by 186 parts of gaseous butylene oxide introduced beneath the liquid surface. At the completion of the reaction, the resulting condensation product had a hydroxyl number of 349 and a Gardner viscosity of 3.8 seconds at 100 degrees centigrade.

Alternatively, the hydroxyalkylation step is conducted by adding to the vacuum distilled product an equal weight of 37 percent aqueous sodium hydroxide solution, followed by the introduction of butylenechlorohydrin, while maintaining the temperature in the range of 120 to 150 degrees centigrade.

The hydroxyalkylation step is also suitably carried out by adding to the vacuum distilled phenol-sulfur condensate one percent by weight of ethylene carbonate catalyst, and then introducing butylene carbonate to the mixture while maintaining the temperature in the range of 120 to 150 degrees centigrade.

EXAMPLE 9

The condensation products of the invention are produced from phenyleneoxy alkanols by the following process. To an agitated reactor were added 207 parts by weight of 2-phenoxyethanol and 129 parts of 2,4-dichlorobenzene, and the temperature was adjusted to 50 degrees centigrade. Then 103 parts of sulfur dichloride were added beneath the liquid level. Upon completion of the reaction, the unreacted 2-phenoxyethanol was removed by vacuum distillation, leaving an amber-colored sulfur condensation product. Then 0.5 part of metallic sodium was added to the reactor, followed by 90 parts of ethylene oxide, which was introduced beneath the liquid surface. The resulting condensation product was amber-colored.

EXAMPLE 10

The condensation product of the invention wherein the phenyleneoxy alkanol radicals are joined by sulfur oxide radicals was produced by the following illustrative process. Twenty-five parts by weight of the condensation product of Example 1 were introduced to an agitated reactor, and the temperature was adjusted to 50 degrees centigrade. Then, 35 parts of a 30 percent aqueous hydrogen peroxide solution was added slowly over a period of about 15 minutes. An exothermic reaction raised the temperature to 102 degrees. When the reaction was completed, the reaction mixture was stripped under vacuum to remove water by-product. The resulting product was amber-colored. Infra-red analysis indicated the presence of both sulfoxide and sulfone radicals in the oxidation product.

The oxidized product of the invention can be produced by similar processes, utilizing the organic peroxides, such as benzoyl peroxide, as the oxidizing agent.

EXAMPLE 11

A polymer blend was prepared by mixing 70 parts of the sulfur condensation product of Example 1, 20 parts of the sulfur condensation product of Example 6, 10 parts of trimethylolpropane, 5 parts of tris-(betachloroethyl) phosphate, and 30 parts of trichlorofluoromethane. A semi-prepolymer was prepared by reacting a commercial polyether comprising the reaction product of trimethylol propane and ethylene oxide, and polymethylene polyphenylisocyanate. Then, the polymer blend and the prepolymer were mixed with vigorous agitation and discharged into a mold to produce a polyurethane foam having a density of 2.6 pounds per cubic foot, and a fine cell structure. The cured foam had the following properties:

Compressive yield:
    Parallel to direction of
      rise _____ 33.0 pounds per square inch.
    Perpendicular to direction
      of rise _____ 24.0 pounds per square inch.
Effect of aging:
    100% relative humidity at
      70° C.—1 week _____ 5.0% volume increase
      125° C. for 1 hour _____ 7.0% volume increase; 0.5% weight decrease.
5% volume expansion temperature _____ 121° C.

EXAMPLE 12

Another polyurethane foam is prepared using a commerical mixture of 2,4- and 2,6-tolylene diisocyanate isomers in the process of Example 11.

EXAMPLE 13

To 100 parts of the condensation product of Example 2 were blended 0.5 part of triethylamine, and 1.5 parts of a silicone-glycol copolymer cell controller. The polyol blend was vigorously mixed with 63 parts of polymethylene polyphenylisocyanate and 25 parts of trichlorofluoromethane, and discharged into a mold. The resulting foam was cured at 80 degrees centigrade for 30 minutes. The cured foam product had a uniform, fine cell structure and the following additional properties:

Density _____ 2.2 pounds per cubic foot
Compressive Yield _____ 14.0 pounds per square inch.
Weight change on heating 1 hour at 125° C. _____ 2.0 percent decrease.

EXAMPLE 14

To 90 parts of the condensation product of Example 4 are blended 10 parts of trimethylol propane, 1.5 part of a silicone-glycol copolymer cell controller, and 0.5 part of triethylamine. The resulting polyol blend was vigorously mixed with 100 parts of polymethylene polyphenylisocyanate and 25 parts of trichlorofluoromethane, and discharged into a mold. The resulting foam was cured at 80 degrees for 30 minutes, and had the following properties:

Density _____ 2.2 pounds per cubic foot.
Tensile strength _____ 116.6 pounds per square inch.
Shear strength _____ 28.0 pounds per square inch.
Change on heating 1 hour at 125° C. _____ 0.37% weight decrease; 5.48% volume increase.
Cellularity _____ 0.0 percent open cells.
k-Factor _____ 0.09 B.t.u.-inch/hour-ft.$^2$-°F.

The foam is useful for insulation purposes in refrigerators.

EXAMPLE 15

Ninety parts of the condensation product prepared in Example 1 were blended with 10 parts of a commercial mixture of approximately equimolar amounts of monobutyl acid phosphite and dibutyl acid phosphate, and 1.5 parts of a silicone-glycol copolymer cell controller. The resulting polyol blend was vigorously mixed with 91 parts of polymethylene polyphenylisocyanate and 28 parts of trichlorofluoromethane. The resulting foam was cured at 80 degrees for 30 minutes to provide a foam having properties shown in Table 1.

EXAMPLE 16

Ninety parts of the condensation product of Example 1, 10 parts of trimethylol propane, 10 parts of tris-(betachloroethyl) phosphate, 0.75 part of triethylamine and 1.5 parts of a silicone-glycol copolymer cell controller were pre-blended, and then vigorously mixed with 109 parts of polymethylene polyphenylisocyanate and 28 parts of trichlorofluoromethane, and discharged into a mold. The resultsing foam was cured at 80 degrees centigrade for 30 minutes, and had the properties shown in Table 1.

EXAMPLE 17

The procedure of Example 16 was repeated except that the phosphorus compound employed was tricresyl phosphate. The properties of the cured foam are shown in Table 1.

TABLE I

| | Example | | |
|---|---|---|---|
| | 15 | 16 | 17 |
| Density, pounds per cubic foot | 2.1 | 2.2 | 2.0 |
| Compressive yield, pounds per square inch | 43 | 38 | 33.0 |
| Effect of aging at 125° C. for 1 hour: | | | |
| Weight change, percent | −0.2 | −0.3 | −0.4 |
| Volume change, percent | +2.0 | +4.0 | +5.0 |
| 5% volume expansion temperature, °C | 143 | 138 | 133 |
| k-factor, Btu-inch/hour-ft.$^2$ −°F | 0.10 | 0.085 | 0.11 |
| Fire resistance: | | | |
| ASTM Test D-757-49, inches per minute | 0.43 | 0.41 | 0.44 |
| ASTM Test D-1692-59T | (¹) | (¹) | (¹) |

¹ Nonburning.

The foams produced in Examples 15, 16, and 17 are particularly useful in the production of fire retardant building panels.

Useful polyurethane foams are also prepared by employing the condensation product of Example 10 in the process of Example 15.

The following examples illustrate other phosphorus compounds that are useful in the procedures illustrated in Examples 15–17.

Example:
18 _____ Diamyl amylphosphonate.
19 _____ Trimethyl phosphite.
20 _____ 2,3-dibromopropyl diphenylphosphinite.
21 _____ Methyl diethylphosphinate.
22 _____ Phenylphosphonic acid.
23 _____ Ethyl phosphorous acid.
24 _____ Phosphoric acid.

EXAMPLE 25

Eighty parts of the condensation product prepared in Example 1, 0.5 part of triethylamine, and 1.5 parts of a silicone glycol copolymer cell controller were blended with 20 parts of a polyester containing an adduct of hexahalocyclopentadiene. The halogen-containing polyester was the reaction product of components comprising 12 moles of trimethylol propane and 6 moles of 1,4,5,6,7,7-hexachlorobicyclo-(2.2.1)-5-heptene-2,3-dicarboxylic acid and had an acid number of about 5 and a hydroxyl number of 365. The polyol blend was vigorously mixed for one minute with 90 parts of polymethylene polyphenylisocyanate, and 25 parts of trichlorofluoromethane, and poured into a mold. The resulting foam was cured at 80 degrees for 30 minutes to produce a product having the following properties:

Density _____ 2.1 pounds per cubic foot.
Compressive yield _____ 38.0 pounds per square inch.
Change on heating 1 hour at 125° C. _____ 0.3% weight loss; 2.5% volume
5% volume expansion temperature _____ 153° C.
Fire resistance, ASTM D-1692-59T _____ Non-burning.
k-Factor _____ 0.10 B.t.u.-inch/hour-ft.$^2$ −°F.

EXAMPLE 26

A polyurethane casting was prepared by the following process. One hundred parts of the condensation product of Example 1 were mixed with 88 parts of polymethylene polyphenylisocyanate until the components were compatible. The reactive mixture was poured into a mold where gelation occurred to produce a very hard, rigid casting having a density of 37 pounds per cubic foot.

While the invention has been described with reference to certain specific embodiments, it will be recognized by those skilled in the art that many variations are possible without departing from the spirit and scope of the invention.

I claim:
1. A sulfur chloride or sulfur bromide condensation product of phenyleneoxyalkanol radicals wherein the latter radicals are joined by sulfur-bearing radicals selected from the group consisting of one to four connected sulfur atoms, and a sulfur oxide radical, wherein said phenyleneoxyalkanol radicals have the formula

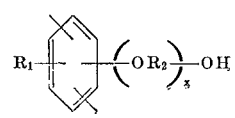

wherein $R_1$ is selected from the group consisting of hydrogen, fluorine, chlorine, bromine, alkyl and alkenyl groups of 1 to 18 carbon atoms, alicyclic groups of 5 to 18 carbon atoms, and aryl and aralkyl groups of 6 to 18 carbon atoms; $R_2$ is a hydrocarbon radical of 2 to 18 carbon atoms, and $x$ is from 1 to 20;

said product having an average of 2.5 to 7 phenyleneoxy alkanol radicals per molecule, a ratio of 0.85 to 1 atom of sulfur per phenyleneoxyalkanol radical, a hydroxyl number in the range of 200 to 400, and a viscosity in the range of 50 to 500 Gardner seconds at 50 degrees centigrade.

2. A sulfur chloride condensation product of phenyleneoxyalkanol radicals wherein the latter radicals are joined by 1 to 4 connected sulfur atoms, wherein said phenyleneoxyalkanol radicals have the formula

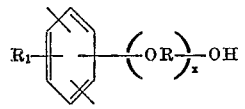

wherein $R_1$ is selected from the group consisting of hydrogen, fluorine, chlorine, bromine, alkyl and alkenyl groups of 1 to 18 carbon atoms, alicyclic groups of 5 to 18 carbon atoms, and aryl and aralkyl groups of 6 to 18 carbon atoms; $R_2$ is a hydrocarbon radical of 2 to 18 carbon atoms, and $x$ is from 1 to 20;

said product having an average of 2.5 to 4 phenyleneoxy alkanol radicals per molecule, a ratio of 0.85 to 1 atom of sulfur per phenyleneoxyalkanol radical, a hydroxyl number in the range of 200 to 400, and a viscosity in the range of 50 to 500 Gardner seconds at 50 degrees centigrade.

3. The product of claim 2 wherein $R_1$ is hydrogen.

4. The product of claim 3 wherein $R_2$ is an ethylene radical.

References Cited

UNITED STATES PATENTS 2,629,743  2/1953  Burnette et al. ____ 260—609 X

CHARLES B. PARKER, *Primary Examiner.*

D. R. PHILLIPS, *Assistant Examiner.*